United States Patent [19]

Wilke et al.

[11] Patent Number: 4,557,355
[45] Date of Patent: Dec. 10, 1985

[54] SYSTEM FOR CONTROLLING AN ELECTROMECHANICALLY RECIPROCABLE LOAD

[76] Inventors: Richard Wilke, Am Weissenfeld 4, D-5830 Schwelm; Helmut Korthaus, Fernblick 3, D-5600 Wuppertal 2, both of Fed. Rep. of Germany

[21] Appl. No.: 442,762

[22] Filed: Nov. 18, 1982

Related U.S. Application Data

[63] Continuation-in-part of Ser. No. 420,783, Sep. 21, 1982, abandoned, which is a continuation-in-part of Ser. No. 244,302, Mar. 16, 1981, abandoned.

[30] Foreign Application Priority Data

Mar. 18, 1980 [DE] Fed. Rep. of Germany ....... 3010335

[51] Int. Cl.$^4$ ............................................. B60T 13/04
[52] U.S. Cl. .............................. 188/173; 188/196 R; 192/90; 192/111 A; 254/DIG. 2
[58] Field of Search ............... 188/180, 171, 173, 162, 188/196 R; 192/90, 111 A; 254/DIG. 2

[56] References Cited

U.S. PATENT DOCUMENTS

| | | | |
|---|---|---|---|
| 960,055 | 5/1910 | Sundh | 188/71 |
| 1,324,851 | 12/1919 | Roos | 254/DIG. 2 |
| 1,438,866 | 12/1922 | Sauvage | 188/162 |
| 1,713,228 | 5/1929 | Harrington | 188/171 X |
| 1,852,575 | 4/1932 | Howe | 188/162 |
| 2,182,554 | 12/1939 | Galle | 188/196 R |
| 2,218,605 | 10/1940 | Down | 188/173 |
| 2,246,200 | 6/1941 | Farmer | 188/173 |
| 2,257,301 | 9/1941 | Larson | 188/173 X |
| 2,439,350 | 4/1948 | Taxbox | 188/171 |
| 3,074,517 | 1/1963 | Kohli | 188/171 |
| 3,217,843 | 11/1965 | Newell et al. | 188/173 |
| 3,219,155 | 11/1965 | Kohli | 188/171 |

FOREIGN PATENT DOCUMENTS

| | | |
|---|---|---|
| 2445044 | 4/1975 | Fed. Rep. of Germany ... 192/111 A |
| 2209001 | 3/1976 | Fed. Rep. of Germany . |
| 2512786 | 3/1978 | Fed. Rep. of Germany . |
| 3010335 | 9/1982 | Fed. Rep. of Germany . |
| 612134 | 7/1979 | Switzerland . |

Primary Examiner—George E. A. Halvosa
Attorney, Agent, or Firm—Karl F. Ross; Herbert Dubno

[57] ABSTRACT

An electromechanically reciprocable load has a driving spring tending to displace it from a retracted position into a working position upon the release of a locking brake. The spring force is opposed by the countervailing force of an electric motor which, during the working stroke, is progressively reduced in keeping with the diminishing force of the relaxing spring. When the load includes a caliper of a power brake arresting a rotary element in its working positon, the motor is controlled by a bridge circuit with two potentiometers whose wipers are entrained, with a relative lag, by the load so as to establish a variable null position advancing with progressive wear of the brake linings in order to keep constant the travel of the load during a return stroke brought about by the energization of the electric motor with an overriding signal. An accelerometer monitors the speed of the rotary element to soften the impact of sudden deceleration in the final phase of the brake-actuating stroke by temporarily increasing the countervailing motor force if the rate of deceleration exceeds a predetermined threshold.

6 Claims, 3 Drawing Figures

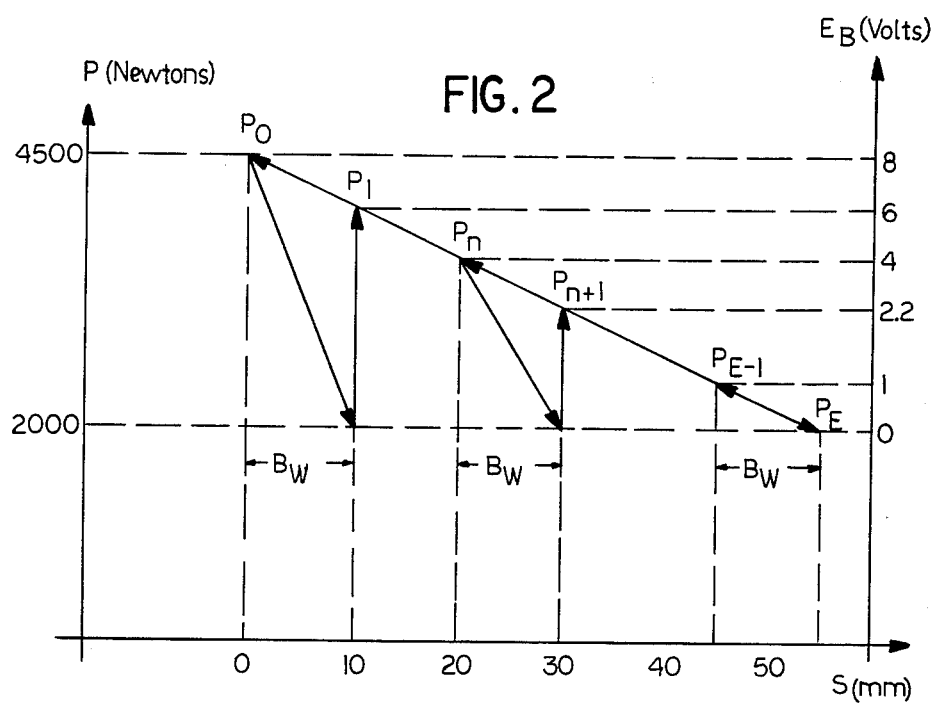
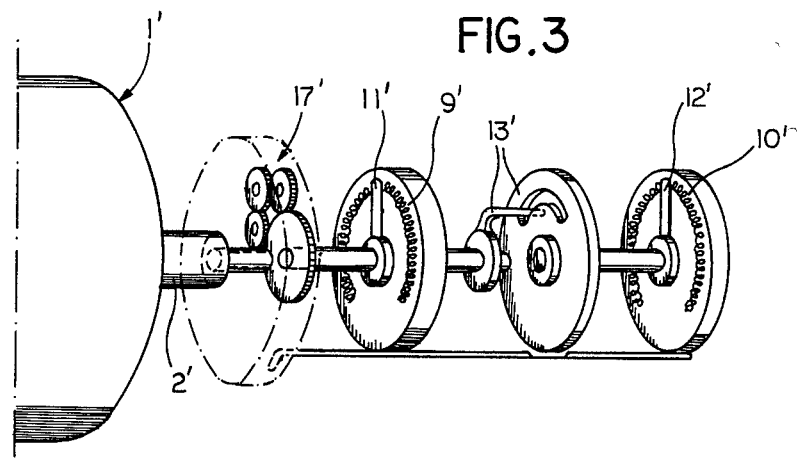

SYSTEM FOR CONTROLLING AN ELECTROMECHANICALLY RECIPROCABLE LOAD

CROSS-REFERENCE TO RELATED APPLICATIONS

This application is a continuation-in-part of our co-pending application Ser. No. 420,783 filed Sept. 21, 1982 as a continuation-in-part of our prior application Ser. No. 244,302 filed Mar. 16, 1981, both now abandoned.

FIELD OF THE INVENTION

Our present invention relates to an electromechanically reciprocable load such as, for example, a power brake of the type used in a railway car and provided with a self-adjustment mechanism that compensates for brakeshoe wear.

BACKGROUND OF THE INVENTION

An electrically resettable railway brake, for instance one of the type described in U.S. Pat. No. 4,175,645, has an actuating member connected with a caliper arm carrying a brakeshoe and displaceable in a forward stroke, i.e. from a disengaged or rest position into an engaged or working position, by a spring driving the brakeshoe against a rotary element to be arrested. The release of the brake, i.e. the reopening of the jaws of the caliper, is performed by the energization of an electric motor whose electromotive force opposes and overcomes the force of the spring assembly. If current should fail, the spring force immediately recloses the brake which therefore acts as a so-called dead man's safety device.

The brakeshoes carried at the free ends of the caliper jaws have linings subject to inevitable wear. Means for compensating that wear are known, for example, from German Pat. No. 2,512,786 and from Swiss Pat. No. 612,134 according to which a ratchet mechanism automatically resets the retracted or rest position of the actuating member whenever the closure stroke of the brake exceeds a predetermined distance. Since the spring assembly is under a maximum stress in the retracted position of the actuating member, the progressive advance of the closure stroke with continuing wear of the brake linings is accompanied by a proportional relaxation of the spring force so that, in the working position of the brake, the rotary element is less firmly gripped between the jaws when the linings are partly worn.

With a different type of electromechanically reciprocable load, e.g. a door or gate to be closed by a spring force and to be reopened by a countervailing electromotive force, the spring force progressively weakens during the closure stroke. Thus, the force exerted at the beginning of that stroke must substantially exceed that required to keep the door closed. This means that a person or an object accidentally standing in the doorway at the beginning of closure could be subjected to considerable pressure between the door and its frame even though only a fraction of that pressure is available in the terminal phase of the closing motion.

OBJECTS OF THE INVENTION

The general object of our present invention, therefore, is to provide means in such an electromechanical load-control system for exerting a substantially constant force upon an actuating member during a forward stroke thereof.

A more particular object is to provide an electromechanical power brake whose gripping force is substantially unaffected by shifts in its working position due to the wear of a brake lining.

A further object is to provide means for softening the impact of a power brake upon a rotary element engaged thereby if such engagement results in an overly rapid deceleration of, say, a vehicle equipped with that brake.

SUMMARY OF THE INVENTION

A system embodying our invention comprises, according to its broader aspects, spring means mechanically coupled with a load for driving same in a forward stroke from a retracted position to a working position, an electric motor operatively coupled with the load and provided with an energizing circuit for exerting thereon a countervailing force opposing the driving force of the spring means, and control means in that energizing circuit for modifying this countervailing force in response to external commands so that the driving force is yieldably resisted by the countervailing force during the forward stroke and is overridden by the latter in a return stroke. A position sensor and/or a speed monitor, forming part of the control means, is coupled with the load for progressively reducing the countervailing force during the forward stroke in substantial conformity with the progressive diminution of the driving force due to relaxation of the spring means, and/or for temporarily increasing this countervailing force in a final phase of that stroke to soften the impact due to sudden deceleration as the load is brought to a stop.

Thus, in our system the electric motor serves not only to restore the load to its retracted position but also to partly counterbalance the spring force to an ever-diminishing extent during a forward stroke so that the resulting net force exerted upon the load is substantially constant throughout that stroke. The aforementioned safety feature, e.g. in the case of a power brake, is preserved since an accidental de-energization of the motor will subject the load to the full spring force. In normal operation, however, only the uncompensated part of the spring force will be effective.

According to a more particular feature of our invention, the position sensor of the control means is a potentiometer whose wiper is entrainable by the load, e.g. by the actuating member of a power brake. Advantageously, that potentiometer is part of a bridge circuit with a first diagonal defined by its wiper and by a reference point which preferably is constituted by the wiper of a second potentiometer. A switching circuit connected across the first bridge diagonal and a power supply connected across a second bridge diagonal, also forming part of the control means, serve to energize the motor in an unbalanced state of the bridge. The motor may be provided, as known per se from the aforementioned U.S. Pat. No. 4,175,645, with an ancillary brake for immobilizing same in its de-energized state when the bridge is balanced. The ancillary brake is released upon initiation of a forward stroke by an appropriate external command.

When the load includes an actuating member of a power brake with linings subject to wear as discussed above, we prefer to provide a lost-motion coupling between the wipers of the two potentiometers referred to so that the wiper of the second potentiometer is entrainable by the actuating member through that coupling with a lag relative to the wiper of the first potentiometer whereby a balanced state of the bridge circuit is established in positions along the two potentiometers which advance with progressive wear of the brake linings. Such a lost-motion coupling, designed to maintain a constant length of the closure stroke, will not be needed when the load is a door or some other member to be displaced linearly or otherwise—between two fixed positions.

BRIEF DESCRIPTION OF THE DRAWING

The above and other features of our invention will now be described in detail with reference to the accompanying drawing in which:

FIG. 2 is a diagram serving to explain the operation of the system shown in FIG. 1; and FIG. 3 is a perspective view of part of a modified system according to our invention.

SPECIFIC DESCRIPTION

Figure 1:
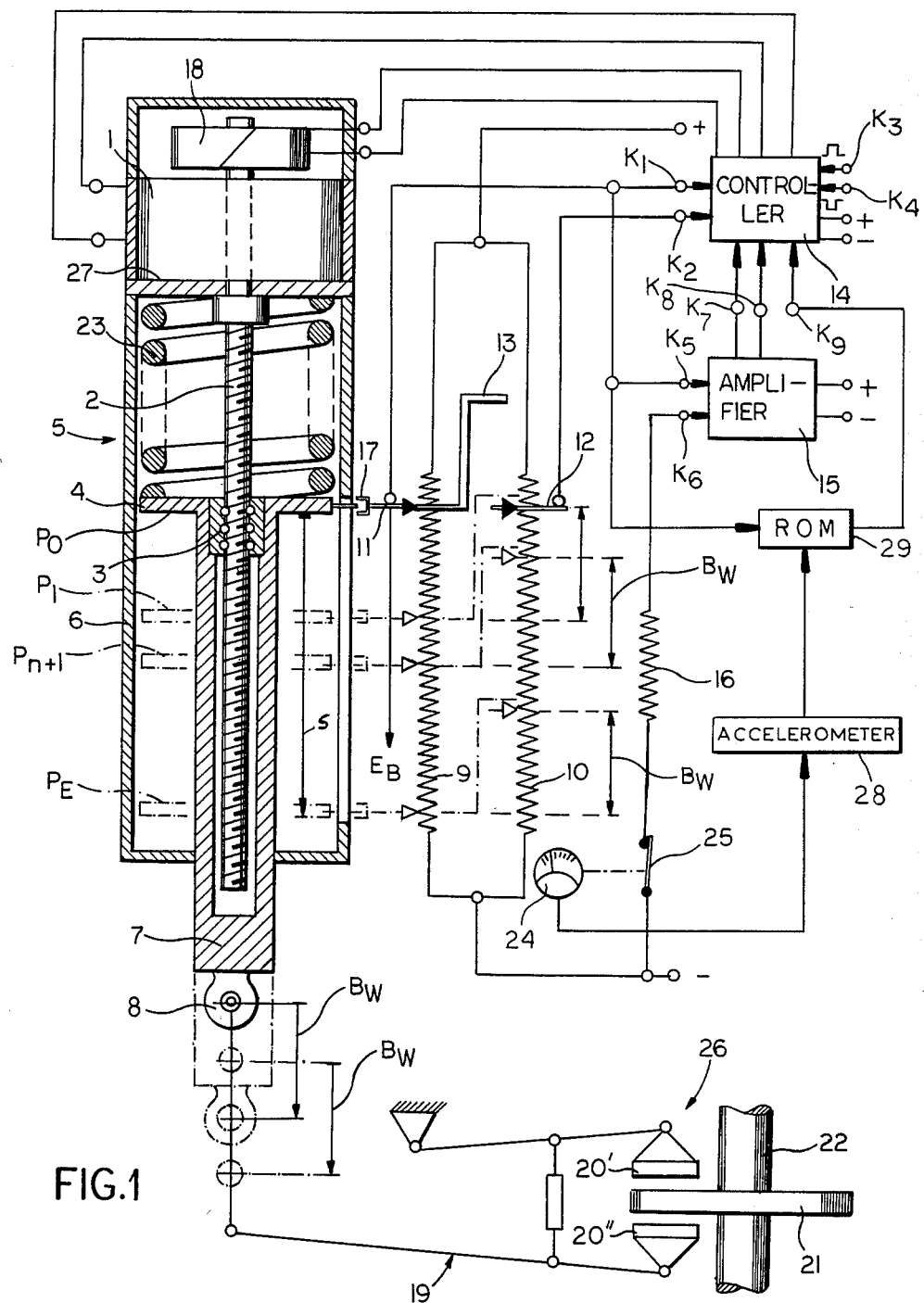
FIG. 1 is a partly diagrammatic, partly structural view of a brake system embodying our invention.

In FIG. 1 we have shown a power brake, generally designated 26, with two brakeshoes having linings 20', 20" carried on opposite jaws of a caliper 19. One arm of this caliper is tied to an eye 8 of a tubular plunger 7 which is slidable in a spring housing 6 provided with a partition 27. A heavy-duty compression spring 23 bears upon that partition and upon an anchor plate or head 4 integral with plunger 7. Housing 6 is part of a drive unit also including a series-wound direct-current motor 1, lodged between partition 27 and an adjoining end wall, which has a threaded output shaft 2 linked with plunger 7 through a low-friction recirculating-ball coupling 3 which translates its torque into a linear force tending to compress the spring 23. Such a coupling, known per se, is more fully described in our copending application Ser. No. 195,784 filed Oct. 10, 1980, now U.S. Pat. No. 4,366,723. The opposite end of shaft 2 carries an ancillary electromagnetic locking brake 18 of the type shown in U.S. Pat. No. 4,175,645.

Motor 1 and brake 18 are alternatively energizable by a controller 14 (constituted by an electronic switching circuit) responsive on the one hand to external commands, applied thereto via input terminals $K_3$ and $K_4$, and on the other hand to a bridge circuit comprising two potentiometers 9 and 10 with respective wipers 11 and 12 connected across other input terminals $K_1$ and $K_2$ thereof. Wiper 11 is detachably connected, via a mechanical coupling 17, with the head 4 of plunger 7 so as to be entrainable by the brake-actuating member 7, 8. The two wipers 11 and 12 constitute the ends of one diagonal of the bridge circuit whose other diagonal is defined by the interconnected extremities of potentiometers 9 and 10 which are respectively connected to the positive and the negative terminal of a supply of direct current. The same supply also feeds the controller 14 and an amplifier 15 with inputs $K_5$ and $K_6$ respectively connected to wiper 11 (in parallel with controller terminal $K_1$) and to the negative supply terminal, the latter connection including a switch 25 in series with a high-ohmic resistor 16 designed to minimize the effect of the input current of amplifier 15 upon the balance of the bridge. Amplifier 15 has output leads connected to further input terminals $K_7$, $K_8$ of the controller. Switch 25 is coupled to a tachometer 24 which is driven by a shaft 22 carrying a brake disk 21, the latter being bracketed by the jaws of caliper 19 of power brake 26 so as to be arrested in the working position of that brake. On standstill of shaft 22, which may be an axle of a railroad car or other vehicle, switch 25 opens to cut off the amplifier 15 along with the controller 14 which thereupon deactivates the motor 1 as well as its locking brake 18; as will become apparent hereinafter, such cutoff enables the full force of spring 23 to be exerted upon the caliper 19 to hold the disk 21 clamped between brake linings 20' and 20". The latter feature, known per se from German Pat. No. 2,209,001, will not be needed in every instance and is not essential to the operation of our system.

In the illustrated wide-open position of brake 26, plunger 7 is fully retracted so that spring 23 is under maximum compression. This retracted position has been designated $P_0$ with reference to the plunger head 4 and to the potentiometer wiper 11. Other positions illustrated by way of example are two intermediate positions $P_1$ and $P_{n+1}$ as well as a final position $P_E$. The displacement of plunger 7 between positions $P_0$ and $P_E$ has been designated S. Wiper 11 is shown provided with a lost-motion coupling 13 which engages the companion wiper 12 with a certain lag representing an invariable caliper stroke $B_W$.

In operation, starting from the fully retracted position $P_0$, a brake-actuating command applied (e.g. as a positive pulse) to terminal $K_3$ causes the controller 14 to release the previously operated locking brake 18 and to energize the motor 1 for a time sufficient to drive the plunger 7 downward (as viewed in FIG. 1) along with wiper 11, this resulting in an unbalancing of the bridge circuit. That unbalance, by closing an internal gate of the controller, allows the energization of motor 1 to be continued (after the disappearance of the command pulse at $K_3$) with a voltage determined by the output of amplifier 15 which in turn depends on a voltage difference $E_B$ measured between wiper 11 and the negative supply terminal. With that voltage difference relatively high at the beginning of the forward stroke, motor 1 generates a large electromotive force opposing the driving force of spring 23. As the plunger 7 descends, control voltage $E_B$ diminishes and so does the countervailing torque of motor 1 even as the force of the expanding spring 23 is progressively reduced to a corresponding extent.

Let us assume, by way of example, that the spring 23 in its fully compressed state—as shown in FIG. 1—exerts a force P of 4500 Newtons upon plunger 7; this has been illustrated in FIG. 2 where, for an advance S=0, the corresponding level $P_0$ of plunger head 4 and wiper 11 causes the appearance of a control voltage $E_B=8$ V on terminals $K_1$, $K_5$ (FIG. 1). Since, however, the bridge is in its balanced or null position with wipers 11 and 12 on the same level, that control voltage does not result in the energization of motor 1. When, now, a brake-actuating command is delivered to terminal $K_3$, the release of locking brake 18 and the simultaneous start-up of motor 1 drives the plunger 7 and the wiper 11 down so that an unbalance occurs and the controller 14 is switched as soon as the wiper has advanced by a small fraction of distance $B_W$ so that the potential difference between terminals $K_1$ and $K_2$ surpasses a certain threshold. From that point on, voltage $E_B$ (as translated by amplifier 15 into a potential difference between terminals $K_7$ and $K_8$) controls the energization of motor 1 and thus the countervailing torque which opposes but does not prevent the expansion of spring 23; this countervailing torque is of such magnitude that the net force acting upon plunger 7 is 2000 Newtons. Thus, when position $P_1$ is reached after an advance $S=B_W=10$ mm, the spring force has been reduced to 4060 Newtons while the opposing force amounts to 2060 Newtons with $E_B=6$ V. With new brake linings 20' and 20'' it is assumed that the caliper 19 arrests the disk 21 exactly in this position $P_1$, i.e. after a closure stroke of length $B_W$. It will be noted that the lost-motion coupling 13, operating with a lag of the same length $B_W$, has not displaced the follower or reference wiper 12 when the leading wiper 11 has slid into position $P_1$. If the tachometer-controlled switch 25 is present, the immobilization of load shaft 22 will cause a cutoff of motor 1 as described above so that the full spring force of 4060 Newtons will act upon brake disk 21; if that switch is omitted, the clamping force of power brake 26 will be determined by the net force of 2000 Newtons exerted upon actuator 7, 8.

When the brake 26 is to be released, an external command (e.g. in the form of a negative pulse) is applied to terminal $K_4$ whereupon controller 14 energizes the motor 1 with the full supply voltage, e.g. of 24 V, to increase the force of the motor independently of voltage $E_B$ to its maximum value of at least 4500 Newtons, thereby overcoming the driving force of spring 23 and returning the plunger 7 along with wiper 11 to the initial rest position $P_0$ in which the rebalancing of the bridge resets the controller 14 to de-energize the motor and to actuate its locking brake 18.

With progressive wear of brake linings 20' and 20'', the position of plunger 7 at the end of its forward or working stroke will go lower so that wiper 11 will descend below position $P_1$, laggingly entraining wiper 12 below its starting level $P_0$. As a result, the return stroke initiated by a brake-releasing command on terminal $K_4$ will also stop at progressively lower positions, i.e. as soon as wiper 11 has ascended to the new level of wiper 12 so as to rebalance the bridge. When, for instance, that level corresponds to a position $P_n$ reached after a displacement of $S=20$ mm as indicated in FIG. 2, the working stroke will end in position $P_{n+1}$ which again is separated by a stroke length $B_W=10$ mm from the last rest position. With the spring force P reduced to about 3600 Newtons in position $P_n$, which corresponds to a control voltage $E_B=4$ V yielding an opposing motor force of 1600 Newtons, the advance to position $P_{n+1}$ further lowers the spring force to about 3160 Newtons and diminishes the control voltage to $E_B=2.2$ V corresponding to a countervailing motor force of 1160 Newtons; the resulting net force, again, is 2000 Newtons.

The last rest position which will let the power brake 26 safely operate with greatly worn linings 20', 20'' has been designated $P_{E-1}$ in FIG. 2. That position, attained after a displacement of slightly more than 40 mm from starting point $P_0$, corresponds to a spring force of about 2460 Newtons opposed by a motor force of 460 Newtons due to a control voltage $E_B=1$ V. The execution of a working stroke starting from position $P_{E-1}$ brings the wiper 11 to its final position $P_E$ with $E_B=0$; this means that motor 1 is de-energized (without operation of locking brake 18 since the bridge is still unbalanced) and that only the driving force of spring 23, diminished by its expansion over more than 50 mm to 2000 Newtons, is effective in position $P_E$. It will be apparent that the tachometric switch 25 will be ineffectual in this final working position.

If tachometer 24 and switch 25 are omitted, an intensification of the clamping pressure in other working positions can be achieved by decoupling the wiper 11 from plunger head 4 and manually sliding it either downward, so as to reduce the countervailing motor torque, or upward to the level of wiper 12 so that motor 1 is cut off. Wiper 12 may also be manually slidable to vary the current rest position, and with it the length of the closure stroke, if this should be desirable. If actuator 7, 8 is linked with a reciprocable load other than a power brake, e.g. a door as mentioned above, coupling 13 should be eliminated so that wiper 12 remains in its initial position $P_0$, causing that load to be always restored to its starting point when a reversing command is fed to controller 14 at terminal $K_4$. A door so operated will therefore always press with the same net force upon an obstacle placed in its path, regardless of the location at which that obstacle is encountered.

In FIG. 3 we have illustrated a modified structure in which an output shaft 2' of a motor 1' is biased clockwise by a nonillustrated cylindrical or spiral spring against an opposing torque exerted thereon by the motor in its energized state. A coupling 17' in the form of a step-down transmission links the shaft 2' with a wiper 11' of a rotary potentiometer 9' and, via a lost-motion coupling 13', with a wiper 12' of a similar potentiometer 10'. The two potentiometers 9', 10' are again connected in a bridge circuit, such as that shown in FIG. 1, and coact with a controller for the selective energization of motor 1' (which can again be provided with a locking brake) in the manner described hereinabove. Such a modified system according to our invention is suitable for driving an arcuately rather than linearly or quasi-linearly reciprocable load.

The coupling 17 of FIG. 1 could also be of the step-down type. In fact, the transmission 17' of FIG. 3 could be driven by an upward extension of shaft 2 in FIG. 1 whose rotary position bears, of course, a definite relationship with the longitudinal position of plunger 7. Thus, potentiometers 9' and 10' may replace potentiometers 9 and 10 of FIG. 1 in such a case.

In accordance with a further feature of our invention illustrated in FIG. 1, tachometer 24 has an output lead extending to a differentiator 28 which acts as an accelerometer by measuring the slope of the tachometer voltage during the deceleration of shaft 22 upon actuation of power brake 26. Accelerometer 28 works into an address input of a read-only memory 29 which has another address input connected to wiper 11 in parallel with terminals $K_1$ and $K_5$. Memory 29 comprises an orthogonal array of cells with rows and columns selectively addressable by the digitized control voltage $E_B$ and by the digitized output voltage of accelerometer 28 in order to emit to an additional input $K_9$ of controller 14 an instruction calling for the augmentation of the input voltage of motor 1, to an extent determined by the addressed memory cell, whenever the rate of deceleration exceeds a predetermined threshold. The increase in motor torque due to the augmented input voltage must, of course, be limited in each instance to a value enabling proper completion of the brake-actuating stroke. Thus, for example, an overly rapid closure of the brake jaws in position $P_1$ may raise the effective control voltage from 6 V to 7 V whereby the countervailing force exerted by the motor is increased from the aforementioned 2060 Newtons to, say, 2280 Newtons so as to reduce the pressure of the brakeshoes upon disk 21 to 1780 Newtons. This reduction will evidently be effective only for a brief period (generally a small fraction of a second) until the rate of deceleration has decreased sufficiently to re-establish the normal braking force of 2000 Newtons; on standstill that force will be raised to 4500 Newtons by the opening of switch 25 which, however, could be omitted as noted above.

Amplifier 15 could be entirely replaced by a suitably programmed analog or digital memory such as ROM 29 delivering to controller 14, throughout a forward stroke and even in the absence of an output from accelerometer 28, instructions based on voltage $E_B$ or on an output signal of some other position sensor entrained by plunger 7. These instructions determine the duty ratio of a chopper included in controller 14 for stepping down the supply voltage before feeding it to motor 1.

We claim:

1. A system for selectively reciprocating a load between a retracted position and a working position, comprising:

spring means mechanically coupled with said load for driving same in a forward stroke from said retracted position to said working position, said spring means being under a maximum stress in the retracted position of said load;

a rotary electric motor operatively coupled with said load and provided with an energizing circuit for exerting thereon a countervailing force opposing the driving force of said spring means;

control means in said energizing circuit for modifying said countervailing force in response to external commands for yieldingly resisting said driving force during a forward stroke and for overriding said driving force in a return stroke, said control means including a position sensor in the form of a first potentiometer having a wiper entrainable by said load for progressively reducing said countervailing force in the course of a forward stroke in substantial conformity with the progressive diminution of said driving force due to relaxation of the stress of said spring means, said first potentiometer constituting part of a bridge circuit with a first diagonal defined by said wiper and by a reference point, said control means further comprising a switching circuit connected across said first diagonal and a power supply connected across a second diagonal of said bridge circuit for energizing said motor in an unbalanced state of said bridge circuit, said motor being provided with brake means for immobilizing same in a balanced state of said bridge circuit, said brake means being releasable by an external command initiating a forward stroke, said reference point being a wiper of a second potentiometer connected in parallel with the first potentiometer across said second diagonal, said load including an actuating member of a power brake with linings subject to wear; and a lost-motion coupling between said wipers, the wiper of said second potentiometer being entrainable by said actuating member through said lost-motion coupling with a lag relative to the wiper of said first potentiometer establishing a balanced state of said bridge circuit in positions along said potentiometers advancing with progressive wear of said linings whereby even application of the brake is ensured with such wear.

2. A system as defined in claim 1 wherein said wipers are disconnectable from said actuating member for selective shifting to adjust the net force acting upon said power brake in said working position.

3. A system as defined in claim 1 wherein said switching circuit has input means connected across a part of said potentiometer bounded by said wiper of said first potentiometer for varying the energization of said motor in proportion to a voltage drop across said part but independently of a voltage difference between said wiper and said reference point in any unbalanced state of said bridge circuit.

4. A system as defined in claim 1 wherein said wiper of said first potentiometer is connected with said load through a step-down transmission.

5. A system as defined in claim 4 wherein said step-down transmission is a gear train coupled with said load through a shaft of said motor.

6. A system for selectively reciprocating a load between a retracted position and a working position, comprising:

spring means mechanically coupled with said load for driving same in a forward stroke from said retracted position to said working position, said spring means being under a maximum stress in the retracted position of said load;

a rotary electric motor operatively coupled with said load and provided with an energizing circuit for exerting thereon a countervailing force opposing the driving force of said spring means; and control means in said energizing circuit for modifying said countervailing force in response to external commands for yieldingly resisting said driving force during a forward stroke and for overriding said driving force in a return stroke, said control means including a position sensor in the form of a first potentiometer having a wiper entrainable by said load for progressively reducing said countervailing force in the course of a forward stroke in substantial conformity with the progressive diminution of said driving force due to relaxation of the stress of said spring means, said first potentiometer constituting part of a bridge circuit with a first diagonal defined by said wiper and by a reference point, said control means further comprising a switching circuit connected across said first diagonal and a power supply connected across a second diagonal of said bridge circuit for energizing said motor in an unbalanced state of said bridge circuit, said motor being provided with brake means for immobilizing same in a balanced state of said bridge circuit, said brake means being releasable by an external command initiating a forward stroke, said reference point being a wiper of a second potentiometer connected in parallel with the first potentiometer across said second diagonal, said load including an actuating member of a power brake coacting with a rotary element for arresting same in said working position, said control means including accelerometer means coupled with said rotary element for temporarily increasing said countervailing force in response to a rate of deceleration exceeding a predetermined threshold in a final phase of said forward stroke.

* * * * *